United States Patent
Coleman

(10) Patent No.: US 8,054,056 B2
(45) Date of Patent: Nov. 8, 2011

(54) FREQUENCY REGULATED HYSTERETIC AVERAGE CURRENT MODE CONVERTER

(75) Inventor: Edward P. Coleman, Salt Springs, FL (US)

(73) Assignee: Texas Instruments Incorporated, Dallas, TX (US)

( * ) Notice: Subject to any disclaimer, the term of this patent is extended or adjusted under 35 U.S.C. 154(b) by 377 days.

(21) Appl. No.: 11/854,652

(22) Filed: Sep. 13, 2007

(65) Prior Publication Data

US 2008/0067993 A1    Mar. 20, 2008

Related U.S. Application Data

(60) Provisional application No. 60/825,908, filed on Sep. 16, 2006, provisional application No. 60/845,468, filed on Sep. 19, 2006.

(51) Int. Cl.
  *G05F 1/56* (2006.01)
  *G05F 1/565* (2006.01)
  *G05F 1/569* (2006.01)
  *G05F 1/575* (2006.01)

(52) U.S. Cl. ........................ 323/282; 323/224

(58) Field of Classification Search .................. 323/224, 323/282, 284, 285, 351
  See application file for complete search history.

(56) References Cited

U.S. PATENT DOCUMENTS

| | | | |
|---|---|---|---|
| 5,867,379 A | 2/1999 | Maksimovic et al. | |
| 6,064,187 A | 5/2000 | Redl et al. | |
| 6,348,780 B1 | 2/2002 | Grant | |
| 6,583,610 B2 * | 6/2003 | Groom et al. | 323/288 |
| 6,628,109 B2 | 9/2003 | Rincon-Mora | |
| 6,747,441 B2 | 6/2004 | Johnson et al. | |
| 7,061,214 B2 | 6/2006 | Mayega et al. | |
| 7,084,612 B2 | 8/2006 | Zinn | |
| 2002/0109487 A1 | 8/2002 | Telefus et al. | |
| 2006/0152947 A1 | 7/2006 | Baker et al. | |

FOREIGN PATENT DOCUMENTS

WO    2007025051 A2    3/2007

OTHER PUBLICATIONS

PCT/US07/78628, Apr. 23, 2008, Coleman, International Search Report.
Application Note 42047; Power Factor Correction (PFC) Basics; dated Aug. 19, 2004, pp. 1-11.
Regan Zane et al.; Nonlinear-Carrier Control for High-Power-Factor Rectifiers Based on Flyback, Cuk or Sepic Converters; 1996 IEEE; pp. 814-820.

* cited by examiner

*Primary Examiner* — Gary L Laxton
*Assistant Examiner* — Nusrat Quddus
(74) *Attorney, Agent, or Firm* — Steven A. Shaw; W. James Brady; Frederick J. Telcky, Jr.

(57) ABSTRACT

A switch mode power converter that precisely controls average switching current and operating frequency. The switching control operative in hysteretic average current mode control provides wide bandwidth operation without the need for slope correction. The switching converter ripple current is varied by a frequency comparator in response to a comparison of the switching frequency to a reference frequency. The ripple current is adjusted to obtain correlation between the operating switching frequency and the reference frequency. Peak current levels are precisely controlled and may be limited to prevent component stress levels from being exceeded. Current levels are continuously monitored with a current sense amplifier, or monitored with a high-gain low energy current sampler. Feedback loop independent line and load regulation is provided by continuous current monitoring, or by using variable slope charge and transfer voltage to pulse width converters when operating with a current sampler based system.

12 Claims, 5 Drawing Sheets

FREQUENCY REGULATED HYSTERETIC AVERAGE CURRENT MODE CONVERTER

CROSS-REFERENCE TO RELATED APPLICATIONS

This application claims the benefit of U.S. provisional applications 60/825,908 filed on Sep. 16, 2006 and 60/845,468 filed on Sep. 19, 2006, which are herein incorporated by reference.

FIELD

Embodiments of the invention relate to switch mode power conversion and, more particularly, to driving loads at selectable current levels and selectable ripple current frequencies from a voltage power source input.

BACKGROUND

Accurate control of peak and average current levels in switch mode power converters is critical to many power conversion applications. Peak current levels must not be exceeded to prevent saturation of the magnetic flux storage medium in the inductor, or magnetic flux storage element. Accurate control of the converter average output current is critical to protect load equipment during system failure modes, such as short circuit conditions, and to protect expensive power conversion elements from damage due to electrical stress. Input current control is needed to reduce the peak stress levels of electromagnetic interference (EMI) input filters components. Also, high power factor correction systems, such as switch mode power factor corrected rectifiers require accurate control of input current levels.

Power conversion systems often require wide bandwidth line and load response to maintain constant current levels into sensitive loads. Light Amplification by Stimulated Emission of Radiation (LASER) loads require precise current control because they respond exponentially to the stimulation current levels that are used to pump the LASER. Very short current stress levels result in catastrophic damage to the LASER, or degradation of the LASER's useable life. Loads, such as organic light emitting diodes, require large pre-charge current pulses, and benefit from being driven by high response rate power converters. Wide bandwidth power converters are needed in portable applications where large output filter capacitors cannot be used to meet load dump demands because they would require too much space.

Rapidly controlled transitions of the power converter output voltage are needed for many types of dynamic loads. This is the case for applications that require a variable output regulation point, such as the radio frequency (RF) power amplifiers in cell phones. The RF power amplifier often requires the highest operating power in cell phone applications. Supplying a variable level power source to the RF power amplifier can increase the RF power amplifier power efficiency significantly.

In RF power amplifier applications, it is important to be able to alter the power source output voltage rapidly, as well as maintain regulation with a minimal value output filter capacitor, if efficiency gains are to be realized. As the RF power amplifier supply is adjusted to meet the transmission power level needs for a specific cell phone environment, there is energy that is wasted in lost output filter capacitor charge. Thus, the power converter should have wide bandwidth response, as opposed to using large output filter capacitors to maintain regulation during rapid load current variations.

It is also critical to RF systems that the power converter have a controllable operating frequency. This is important to insure the switch mode power supply switching noise does not interfere with sensitive RF circuits.

Peak current mode control, average current mode control, and hysteretic average current mode control are typically used to meet some of the demands for power conversion as just described. All of the existing approaches have some adequate features but, unfortunately, these approaches also have many undesirable limitations.

Peak current mode control is typically used to address the needs of wide bandwidth voltage-to-current and voltage-to-voltage power conversion. Peak current mode control operates at a fixed frequency, and improves the bandwidth of the converter by regulating the peak inductor current, and thereby removing the effects of the inductor on the output filter response. Peak current mode control does not accurately regulate average current levels. Peak current mode control improves frequency response, but requires the addition of slope correction for duty cycles greater than 50 percent.

Average current mode control can also be used to meet some of the power conversion requirements as previously described. The operating frequency is fixed, and average current can be controlled accurately. Average current mode control does not require slope correction. However, average current mode control does not provide accurate control of peak current levels. Also, average current mode control uses a high gain current amplifier with ripple feed forward to improve line and load regulation, which can be susceptible to noise. Lastly, average current mode control requires continuously monitored current levels, and their associated losses.

Hysteretic average current mode control provides well regulated current levels and wide bandwidth response, does not require slope correction, but operates at a variable switching frequency, and requires continuously monitored inductor current levels with their associated power losses. A prior art example of a hysteretic average current mode power converter is shown in FIG. 1.

FIG. 1 is a schematic view of a prior art buck hysteretic average current mode converter 10. The buck mode voltage-to-voltage converter topology is presented in this example. However, the two state control method used in hysteretic average current mode control is applicable to many converter topologies, such as, but not limited to, boost, buck-boost, inverting, and active power factor corrected rectifiers.

The first terminal of an inductor 12 is selectively connected to input voltage source 34 with a charge switch 18, and selectively connected to GROUND with a transfer switch 20. The second terminal of the inductor 12 is connected to a filter capacitor 22 and load element 24. The charge switch 18 and transfer switch 20 are controlled by the state of the RS flip-flop (RSFF) 52, which provides the charge transfer control node 50. When the charge transfer control node 50 is in the logic high state, the charge switch 18 is on, and provides a low impedance connection of the inductor 12 between the input voltage source 34, and the filter capacitor 22 and load element 24. When the charge transfer control node 50 is in the logic low state, the charge switch 18 is off, and provides a high impedance disconnect. When the charge transfer control node 50 is in the logic low state, the transfer switch 20 is on, and provides a low impedance connection of the inductor 12 between the filter capacitor 22 and load element 24, and GROUND. When the charge transfer control node 50 is in the logic high state, the transfer switch 20 is off, and provides a high impedance disconnect. The charge switch 18 and transfer switch 20 are typically implemented as break before make switches, which prevents input voltage source 34 to GROUND shoot though currents during switch state transitions.

When the charge transfer control node 50 is in the logic high state, the charge switch 18 is on, and the transfer switch 20 is off. And, the input voltage source 34 is switch connected to the first terminal of the inductor 12. This provides a charging current path for the inductor 12 from the input voltage source 34 to the output node 36, which increases the inductor 12 current. When the charge transfer control node 50 is in the logic low state, the charge switch 18 is off and the transfer switch 20 is on. And, the first terminal of the inductor 12 is switch connected to GROUND through the transfer switch 20, and the second terminal of the inductor 12 is connected to the output node 36. This provides a discharging current path for the inductor 12. Thus, as the charge transfer control node 50 changes logic state, the power converter transitions between charging and discharging the inductor 12. This results in a ripple current as the inductor 12 current achieves a peak current level following the charging period, and a trough current level following the discharge period or transfer period.

The ripple current is monitored by the combination of a current sense element 32, current sense amplifier 14, and supporting passive components. This provides a voltage signal that is proportional to the inductor 12 current at the current monitor node 38. Continuous current monitoring power losses are often high in order to achieve reliable current sense signals, which decreases the power converter efficiency.

During the charging period the inductor 12 current increases, which causes the current monitor node 38 voltage to increase. The current monitor node 38 voltage is compared to the peak demand node 40 voltage by the peak comparator 46. When the current monitor node 38 voltage exceeds the peak demand node 40 voltage, the peak comparator 46 output transitions to the logic high state, and resets the RS flip-flop 52, causing the charge transfer control node 50 to transition to the logic low state. When the charge transfer control node 50 transitions to the logic low state, the charge period is terminated, and the transfer period begins.

During the transfer period the inductor 12 current decreases, which causes the current monitor node 38 voltage to decrease. The current monitor node 38 voltage is compared to the trough demand node 42 voltage by the trough comparator 48. When the current monitor node 38 voltage descends below the trough demand node 42 voltage, the trough comparator 48 output transitions the logic high state, and sets the RS flip-flop 52, causing the charge transfer control node 50 to transition to the logic high state. When the charge transfer control node 50 transitions to the logic high state, the transfer period is terminated, and the charge period begins.

The output node 36 voltage is regulated by controlling the average demand node 44 voltage at the output of the voltage sense amplifier 16 to null the difference between a scaled version of the output node 36 voltage and the voltage reference 35. When the output node 36 is below the desire output voltage level, the average demand node 44 voltage increases, which commands more current to the load element 24 and filter capacitor 22 to increase the voltage at the output node 36. When the output node 36 is above the desired output voltage level, the average demand node 44 voltage decreases, which commands less current to the load element 24 and filter capacitor 22 to decrease the voltage at the output node 36. Thus, the output is voltage regulated as the average demand node 44 voltage is adjusted in response to changes in the output node 36 voltage.

The average demand node 44 is connected to a summation element 28 and a difference element 30. The summation element 28 provides the peak demand node 40 signal by adding the average demand node 44 voltage to one half the ripple demand signal 26. The difference element 30 provides the trough demand node 42 signal by subtracting one half the ripple demand signal 26 from the average demand node 44 voltage. The ripple demand signal 26 is scaled by one half by the multiplication element 54. The ripple demand signal 26 is set to control the ripple current level of the converter, which is proportionally related to the converter switching frequency. However, the converter switching frequency is not accurately controlled, and varies with input voltage source 34, output node 36 voltage, and inductor 12 value. Converter switch frequency variation is highly undesirable for sensitive RF and analog signal condition applications. Therefore, hysteretic average current mode control does not meet the requirements for frequency regulation that are needed for many power conversion applications.

FIG. 2 is a waveform view of prior art signals for the hysteretic average current mode power converter depicted in FIG. 1. This figure illustrates how inductor 12 current, which is proportional to the current monitor node signal 62 voltage, increases and decreases as the peak demand node level 56 and trough demand node level 58 are exceeded and descended below respectively. The average demand node level 60 is centered at one half the ripple demand signal level 70 from the peak demand node level 56 and trough demand node level 58. The charge slope 72 can be calculated by the charge slope equation 64. The transfer slope can be calculated by the transfer slope equation 66. The charge slope equation 64 and transfer slope equation 66 are accurate approximations that are well accepted, and used by power converter designers for deigning switch mode power converters. The switching frequency can be calculated from the charge slope equation 64 and the transfer slope equation 66, and the ripple demand signal level. The switching frequency equation 68 illustrates that conventional hysteretic average current mode control is inversely proportional to inductor 12 ripple current and inductor 12 inductance, and also varies with the input voltage source 34 (Vin) and the output voltage node (Vout).

As illustrated by the description of the prior art, hysteretic average current mode control controls peak, average, and minimum current levels, and achieves wide bandwidth operation without the need for slope correction. However, operating frequency varies with the power converter inductor value, Vin and Vout, and power losses are increased due to continuously monitored inductor current levels.

SUMMARY

Embodiments of the invention provide a switch mode power converter that precisely controls average switching current and operating frequency. The switching control, operative in hysteretic average current mode control provides wide bandwidth operation without the need for slope correction. The switching converter ripple current is varied by a frequency comparator in response to a comparison of the switching frequency to a reference frequency. The ripple current is adjusted to obtain correlation between the operating switching frequency and the reference frequency. Peak current levels are precisely controlled and may be limited to prevent component stress levels from being exceeded. Current levels are continuously monitored with a current sense amplifier, or monitored with a high-gain low-energy current level amplifier. Feedback loop independent line and load regulation is provided by continuous current monitoring, or using variable slope charge and transfer voltage to pulse width converters when operating with a current sampler based current monitor.

BRIEF DESCRIPTION OF THE DRAWINGS

A complete understanding of the embodiments of the invention may be obtained by reference to the accompanying drawings, when considered in conjunction with the previous and subsequent, detailed description, in which.

For purposes of clarity and brevity, like elements and components will bear the same designations and numbering throughout the figures.

DESCRIPTION OF EMBODIMENTS

Definitions:

The following definitions are to aid one skilled in the art in understanding the embodiments of the invention and are not limiting.

The Duty Cycle (D) is the ratio of the charge duration relative to the switching cycle duration.

The Switching Frequency is the operating frequency of the power converter.

The Switching Period or Switching Duration is the amount of time required to complete one switching cycle.

The Charge Cycle, Charge Duration, Switch on time, Energy Charge Duration, or Charge Duration refers to the portion of the switching cycle that is used to charge the inductor 12 or magnetic storage element.

The Trough Charge Current is the inductor or magnetic element current level corresponding to the start of a charge cycle or end of a transfer cycle.

The Peak Charge Current is the inductor or magnetic element current level corresponding to the end of a charge cycle or beginning of a transfer cycle.

Beginning and End of charge or transfer cycle is approximately at or near the beginning or end relative to the duration of the switching cycle.

The Inductor or Magnetic Storage element is the component or components in a power converter system that stores energy in the form of a magnetic field.

The Output Filter Capacitor or Charge Storage element is the component or components in a power converter system that stores energy in the form of an electrostatic field.

The Transfer Cycle, Transfer Period, Energy Transfer Duration, or Transfer Duration refer to the portion of the switching cycle that is used to transfer the stored magnetic energy or inductor energy to the charge storage element or output filter capacitor and load.

Figure 1:
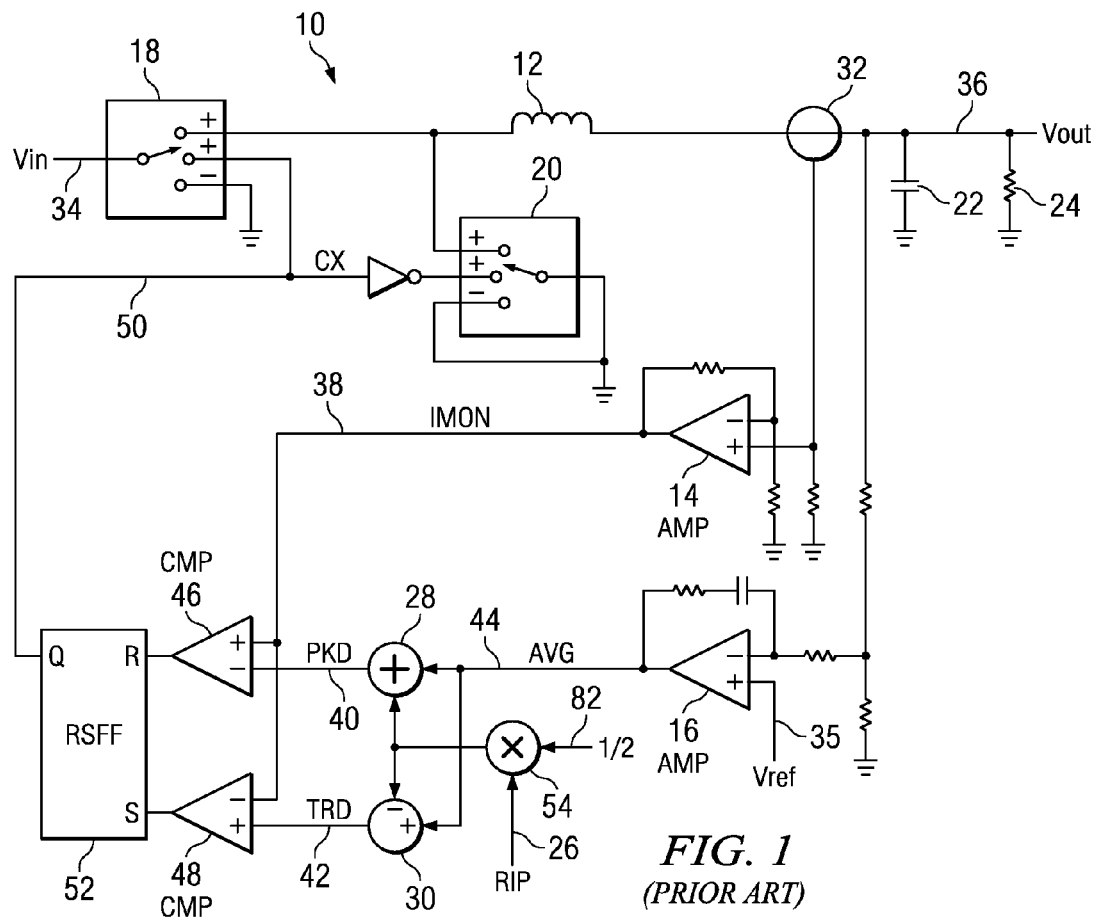
FIG. 1 is a schematic view of a prior art of a hysteretic average current mode power converter.
Figure 2:
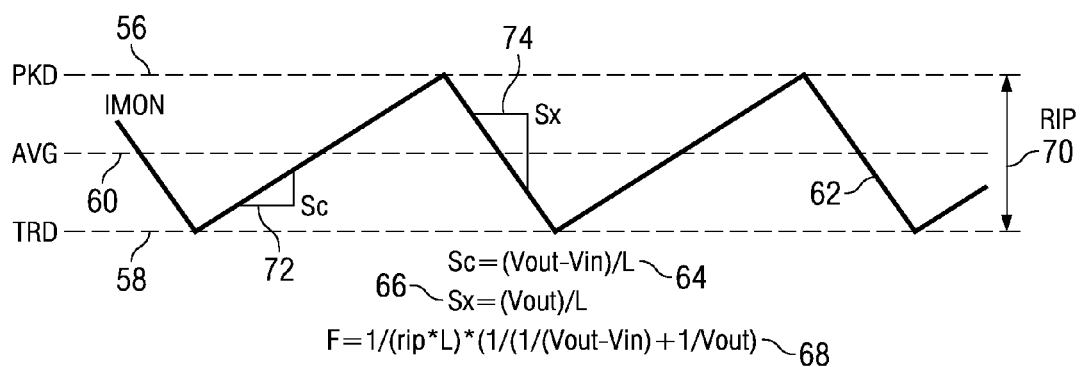
FIG. 2 is a waveform view of a prior art signals for the hysteretic average current mode power converter depicted in FIG. 1.
Figure 3:
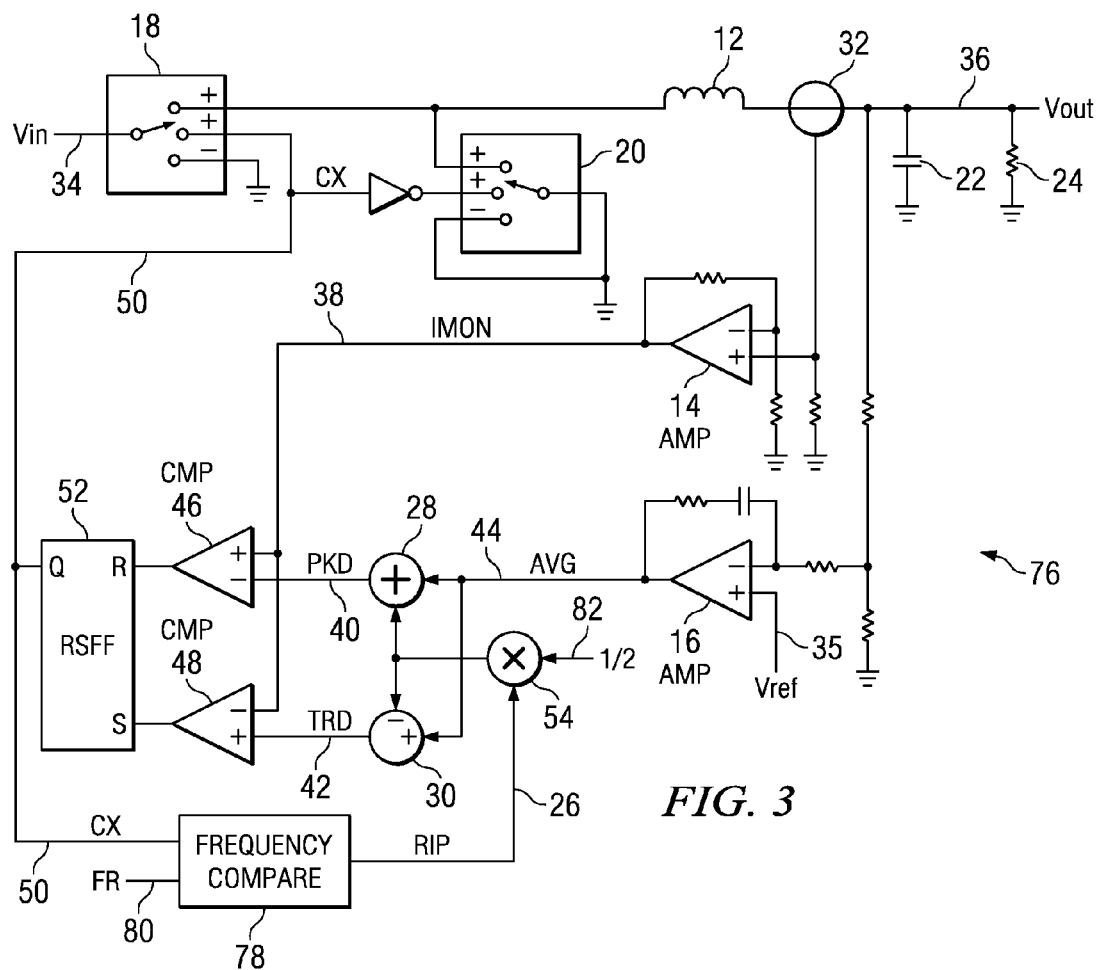
FIG. 3 is a schematic view of a frequency regulated hysteretic average current mode power converter.

FIG. 3 is a schematic view of a frequency regulated hysteretic average current mode converter 76. The buck mode voltage-to-voltage converter topology is presented in this embodiment. However, the frequency regulated two-state control method used in hysteretic average current mode control is applicable to many converter topologies, such as, but not limited to, boost, buck-boost, inverting, and active power factor corrected rectifiers. Frequency regulated hysteretic average current mode control is also applicable to voltage-to-current converters used to drive current dependent loads including, but not limited to LASER, light emitting diodes, and batteries while charging.

The first terminal of an inductor 12 is selectively connected to input voltage source 34 with a charge switch 18, and selectively connected to GROUND with a transfer switch 20. The second terminal of the inductor 12 is connected to a filter capacitor 22 and load element 24. The charge switch 18 and transfer switch 20 are controlled by the state of the RS flip-flop 52, which provides the charge transfer control node 50. When the charge transfer control node 50 is in the logic high state, the charge switch 18 is on, and provides a low impedance connection of the inductor 12 between the input voltage source 34, and the filter capacitor 22 and load element 24. When the charge transfer control node 50 is in the logic low state, the charge switch 18 is off, and provides a high impedance disconnect. When the charge transfer control node 50 is in the logic low state, the transfer switch 20 is on, and provides a low impedance connection of the inductor 12 between the filter capacitor 22 and load element 24, and GROUND. When the charge transfer control node 50 is in the logic high state, the transfer switch 20 is off, and provides a high impedance disconnect. The charge switch 18 and transfer switch 20 are typically implemented as break before make switches, which prevents input voltage source 34 to GROUND shoot though currents during switch state transitions.

When the charge transfer control node 50 is in the logic high state, the charge switch 18 is on, and the transfer switch 20 is off. And, the input voltage source 34 is switch connected to the first terminal of the inductor 12. This provides a charging current path for the inductor 12 from the input voltage source 34 to the output node 36, which increases the inductor 12 current. When the charge transfer control node 50 is in the logic low state, the charge switch 18 is off and the transfer switch 20 is on. And, the first terminal of the inductor 12 is switch connected to GROUND through the transfer switch 20, and the second terminal of the inductor 12 is connected to the output node 36. This provides a discharging current path for the inductor 12. Thus, as the charge transfer control node 50 changes logic state, the power converter transitions between charging and discharging the inductor 12. This results in a ripple current as the inductor 12 current achieves a peak current level following the charging period, and a trough current level following the discharge period or transfer period.

The ripple current is monitored by the combination of a current sense element 32, current sense amplifier 14, and supporting passive components. This provides a voltage signal that is proportional to the inductor 12 current at the current monitor node 38. Current sensing can be accomplished in many ways. Some examples include: secondary magnetically coupled windings, Hall effect devices, current mirrors, and discrete current sampling.

During the charging period the inductor 12 current increases, which causes the current monitor node 38 voltage to increase. The current monitor node 38 voltage is compared to the peak demand node 40 voltage by the peak comparator 46. When the current monitor node 38 voltage exceeds the peak demand node 40 voltage, the peak comparator 46 output transitions to the logic high state, and resets the RS flip-flop 52, causing the charge transfer control node 50 to transition to the logic low state. When the charge transfer control node 50 transitions to the logic low state, the charge period is terminated, and the transfer period begins.

During the transfer period the inductor 12 current decreases, which causes the current monitor node 38 voltage to decrease. The current monitor node 38 voltage is compared to the trough demand node 42 voltage by the trough comparator 48. When the current monitor node 38 voltage descends below the trough demand node 42 voltage, the trough comparator 48 output transitions the logic high state, and sets the RS flip-flop 52, causing the charge transfer control node 50 to transition to the logic high state. When the charge transfer control node 50 transitions to the logic high state, the transfer period is terminated, and the charge period begins.

The output node 36 voltage is regulated by controlling the average demand node 44 voltage at the output of the voltage sense amplifier 16 to null the difference between a scaled version of the output node 36 voltage and the voltage reference 35. When the output node 36 is below the desire output voltage level, the average demand node 44 voltage increases, which commands more current to the load element 24 and filter capacitor 22 to increase the voltage at the output node 36. When the output node 36 is above the desired output voltage level, the average demand node 44 voltage decreases, which commands less current to the load element 24 and filter capacitor 22 to decrease the voltage at the output node 36. Thus, the output is voltage regulated as the average demand node 44 voltage is adjusted in response to changes in the output node 36 voltage.

The average demand node 44 is connected to a summation element 28 and a difference element 30. The summation element 28 provides the peak demand node 40 signal by adding the average demand node 44 voltage to one half the ripple demand signal 26. The difference element 30 provides the trough demand node 42 signal by subtracting one half the ripple demand signal 26 from the average demand node 44 voltage. By generating the peak demand node signal 40 and trough demand node signal 42 so that they maintain a constant average inductor 12 current value as they ripple demand signal 26 varies decouples the frequency control loop from the voltage control loop. The ripple demand signal 26 is scaled by one half by the multiplication element 54. The ripple scalar 82 is one half for this example embodiment. However, the ripple scalar 82 can be increased or decreased to control the frequency regulation loop gain.

The ripple demand signal 26 is set to control the ripple current level of the converter, which also controls the converter switching frequency. The converter switching frequency is controlled by comparing the operating frequency of the converter to a frequency reference 80, and increasing or decreasing the inductor ripple demand signal 26 to set the operating frequency of the converter equal to, or correlated to the frequency reference 80.

The operating frequency of the converter is provided at the output of the RS flip-flop 52 at the charge transfer control node 50. The reference frequency can be provided by an external signal source, or generated within the converter with an oscillator. The external signal source may be the operating frequency of a second power converter with a fixed phase delay to achieve input current balancing for converters that share a common input voltage source, or to achieve output current balancing for converters that share a common output filter. Multiple converters sharing a common output filter are common in high power multi-phase battery charging systems, such as forklift battery chargers.

The frequency comparator 78 increases the ripple demand signal 26 voltage when the charge transfer control node 50 frequency is greater than the frequency reference 80. The ripple current level increases as the ripple demand signal 26 increases, which increases the duration of the charge and transfer periods, and thus, the operating frequency of the converter decreases. The frequency comparator 78 also decreases the ripple demand signal 26 voltage when the charge transfer control node 50 frequency is less than the frequency reference 80. The ripple current level decreases as the ripple demand signal 26 decreases, which decreases the duration of the charge and transfer periods, and thus the operating frequency of the converter increases. The frequency comparator 78 adjusts the operating frequency of the converter, such that the charge transfer control node 50 frequency and frequency reference 80 are equal. The frequency comparator 78 can include frequency scaling to permit the operating frequency of the converter to be a fraction of the frequency reference 80. The frequency comparator 78 can also include the capability to phase lock the frequency reference 80 and the charge transfer control node 50.

Figure 4:
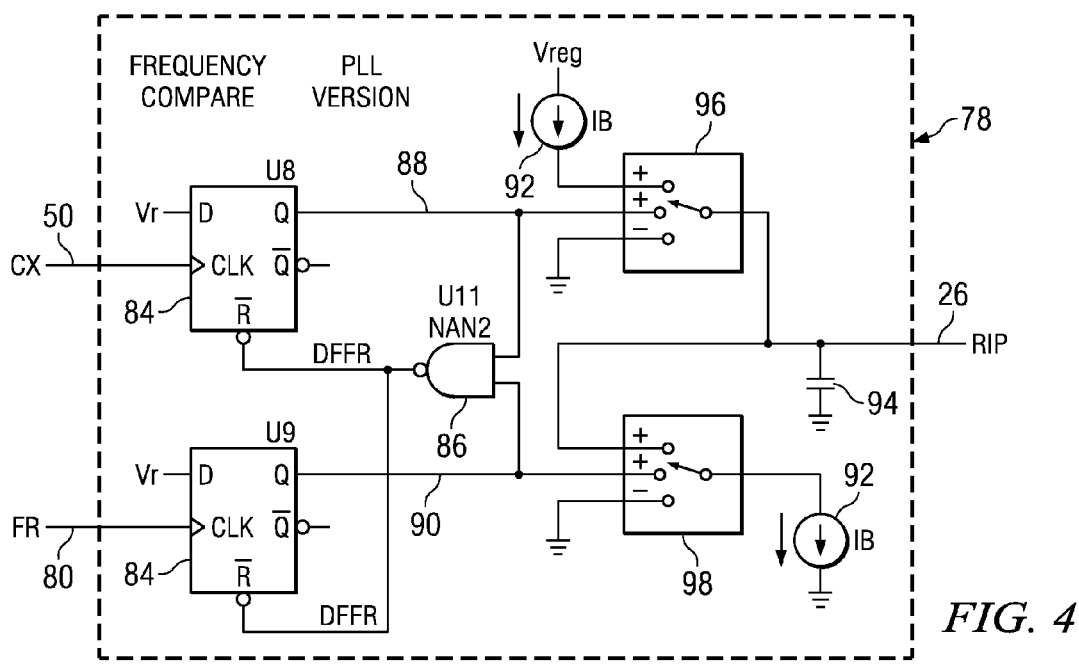
FIG. 4 is a schematic view of a PLL version of frequency compare circuit.

FIG. 4 is a schematic view of a phase lock loop (PLL) version of the frequency comparator 78. The frequency comparator 78 can also be achieved with frequency-to-voltage converters, and a difference amplifier integrator. Alternately, a frequency-to-period and differential period-to-voltage converter can be utilized to provide the functional equivalent of the frequency comparator 78. These examples are for illustration, and are not intended to limit or constrain the implementation of the frequency comparator 78 to any particular approach.

The charge transfer control node 50 and frequency reference 80 are provided to D flip-flops U8 and U9. To begin, consider the case where the charge transfer control node 50 provides a rising edge before the frequency reference 80 rising edge occurs. After the nand logic gate 86 resets the D flip-flop 84 for each input, the rising edge of the charge transfer control node 50 occurs, and sets the increase ripple node 88 to the logic high state. The increase switch 96 is activated and the higher bias current element 92 provides current to the ripple integrator capacitor 94 through the increase switch 96. As the ripple integrator capacitor 94 charges, the ripple demand signal 26 increase. The ripple demand signal 26 continues to increase until the rising edge of the frequency reference 80 signal. The rising edge of the frequency reference 80 signal clocks a logic high to the decrease ripple node 90 causing the nand logic gate 86 to reset the D flip-flops. Once the D flip-flops are reset, the increase switch 96 and the decrease switch 98 are turned off, and the ripple demand signal 26 is held constant until the next rising edge occurs at the charge transfer control node 50, or the frequency reference 80.

Next, consider the case where the frequency reference 80 provides a rising edge before the charge transfer control node 50 rising edge occurs. After the nand logic gate 86 resets the D flip-flops, the rising edge of the frequency reference 80 occurs, and sets the decrease ripple node 90 to the logic high state. The decrease switch 98 is activated and the lower bias current element 92 provides discharge current to the ripple integrator capacitor 94 through the decrease switch 98. As the ripple integrator capacitor 94 discharges, the ripple demand signal 26 decreases. The ripple demand signal 26 continues to decrease until the rising edge of the charge transfer control node 50 signal. The rising edge of the charge transfer control node 50 signal clocks a logic high to the increase ripple node 88 causing the nand logic gate 86 to reset the D flip-flops. Once the D flip-flops are reset, the decrease switch 98 and the increase switch 96 are turned off, and the ripple demand signal 26 is held constant until the next rising edge occurs at the charge transfer control node 50, or the frequency reference 80.

When the rising edge of the charge transfer control node 50 occurs more frequently than the rising edge of the frequency reference 80 signal, the ripple demand signal 26 increases. When the rising edge of the frequency reference 80 signal occurs more frequently than the rising edges of the charge transfer control node 50, the ripple demand signal 26 decreases. Thus, the ripple demand signal 26 is proportional to the difference in the charge transfer control node 50 frequency and the frequency reference 80. The PPL version of the frequency comparator 78 also adjusts the ripple demand signal 26 to phase lock the frequencies that are being compared. This is a known feature of phase lock loops.

Figure 5:
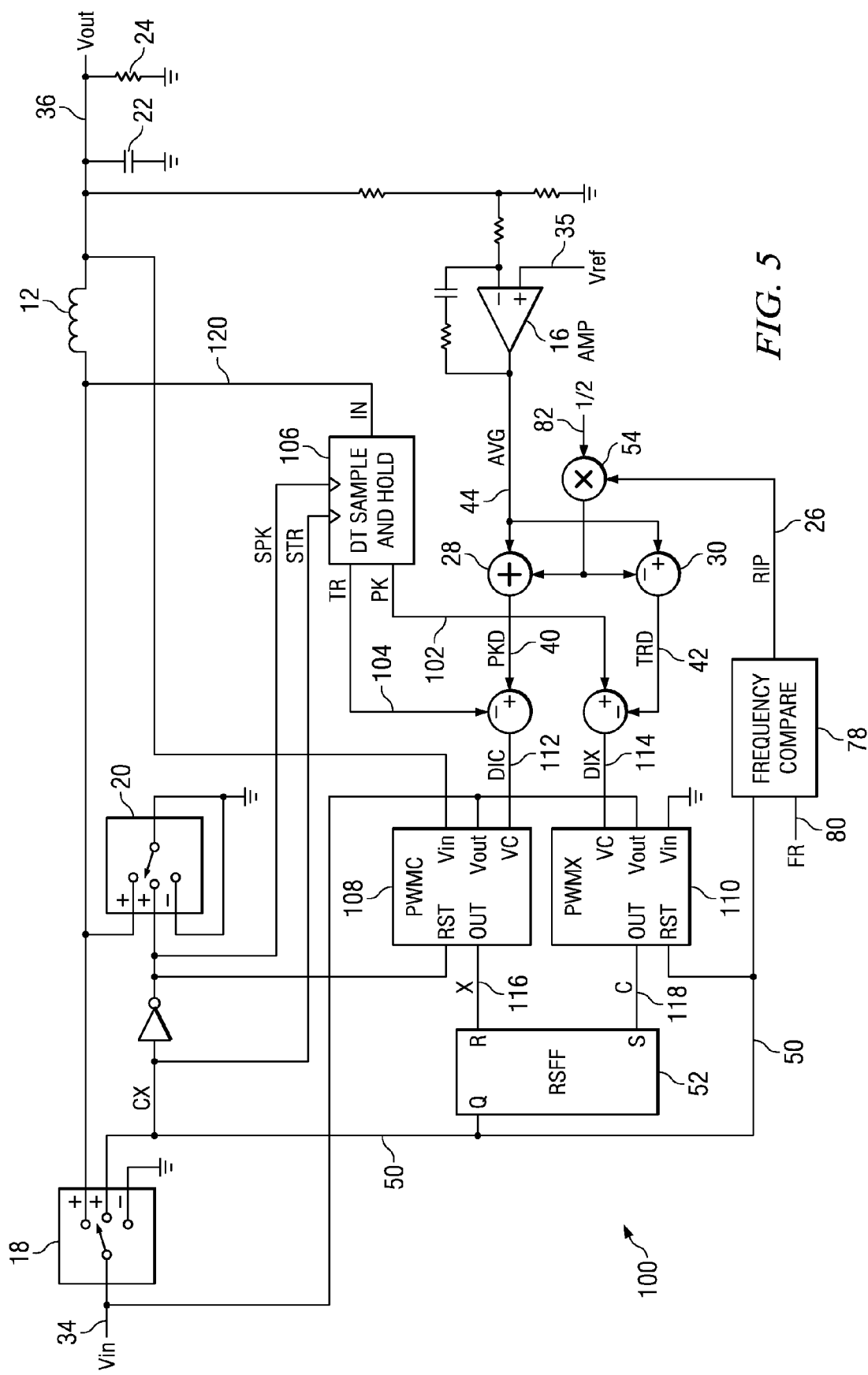
FIG. 5 is a schematic view of a current sampling frequency regulated hysteretic average current mode power converter.

FIG. 5 is a schematic view of a current sampling frequency regulated hysteretic average current mode power converter 100. The buck mode voltage-to-voltage converter topology is presented in this embodiment. However, current sampling frequency regulated hysteretic average current mode converter control is applicable to many converter topologies, such as, but not limited to boost, buck-boost, inverting, and active power factor corrected rectifiers. Frequency regulated hysteretic average current mode control is applicable to voltage-to-current converters used to drive current dependent loads including, but not limited to, LASER, light emitting diodes, and batteries while charging.

The first terminal of an inductor 12 is selectively connected to input voltage source 34 with a charge switch 18, and selectively connected to GROUND with a transfer switch 20. The second terminal of the inductor 12 is connected to a filter capacitor 22 and load element 24. The charge switch 18 and transfer switch 20 are controlled by the state of the RS flip-flop 52, which provides the charge transfer control node 50. When the charge transfer control node 50 is in the logic high state, the charge switch 18 is on, and provides a low impedance connection of the inductor 12 between the input voltage source 34, and the filter capacitor 22 and load element 24. When the charge transfer control node 50 is in the logic low state, the charge switch 18 is off, and provides a high impedance disconnect. When the charge transfer control node 50 is in the logic low state, the transfer switch 20 is on, and provides a low impedance connection of the inductor 12 between the filter capacitor 22 and load element 24, and GROUND. When the charge transfer control node 50 is in the logic high state, the transfer switch 20 is off, and provides a high impedance disconnect. The charge switch 18 and transfer switch 20 are typically implemented as break before make switches, which prevents input voltage source 34 to GROUND shoot though currents during switch state transitions.

When the charge transfer control node 50 is in the logic high state, the charge switch 18 is on, and the transfer switch 20 is off. And, the input voltage source 34 is switch connected to the first terminal of the inductor 12. This provides a charging current path for the inductor 12 from the input voltage source 34 to the output node 36, which increases the inductor 12 current. When the charge transfer control node 50 is in the logic low state, the charge switch 18 is off and the transfer switch 20 is on. And, the first terminal of the inductor 12 is switch connected to GROUND through the transfer switch 20, and the second terminal of the inductor 12 is connected to the output node 36. This provides a discharging current path for the inductor 12. Thus, as the charge transfer control node 50 changes logic state, the power converter transitions between charging and discharging the inductor 12. This results in a ripple current as the inductor 12 current achieves a peak current level following the charging period, and a trough current level following the discharge period or transfer period.

In order to prevent current from flowing from the input voltage source 34 to GROUND as the converter switches between charge and transfer states, a dead time period is used as a transitional state between the charge and transfer states. This period is typically a short duration compared with the period of the operating frequency of the power converter. Dead time switch control, which momentarily turns off the charge switch 18 and transfer switch 20 simultaneously, is typical of most switch mode power supplies.

The current sampling frequency regulated hysteretic average current mode power converter 100 samples the inductor 12 current during the dead time period. Because the sampling period is very short in comparison to the period of the switching frequency, this sample can be a high gain, large power sample without consuming significant average power or energy per switching cycle. The dead time sample and hold 106 provides high gain current samples with minimal power loss, which improves the converter efficiency and the signal-to-noise ratio of the current sample.

The dead time sample and hold 106 provides two inductor 12 current level samples. At the end for the charge cycle when the charge transfer control node 50 transitions to the logic low state, the charge switch 18 and transfer switch 20 are opened due to the break before make characteristic of the switches. The inductor 12 current is directed into the current level sampler, and the peak current level sample is taken. At the end of the transfer cycle when the charge transfer control node 50 transitions to the logic high state, the charge switch 18 and transfer switch 20 are opened due to the break before make characteristic of the switches. The inductor 12 current is directed into the current level sampler, and the trough current level sample is taken. The peak current level sample is stored prior to beginning each transfer cycle, and is provided at the peak sample node 102. The trough current level sample is stored prior to beginning each charge cycle, and is provided at the trough sample node 104. The peak sample node 102 and trough sample node 104 are updated each switching cycle with the most recent peak and trough inductor 12 current levels. A sense current path 120 is provided to direct the inductor 12 current to the dead time sample and hold 106. The sense current path 120 is off (high impedance) when the dead time sample and hold 106 is in hold mode.

The trough sample node 104 is subtracted from the peak demand node 40 to provide a signal that is proportional to the change in current that is required to achieve the peak demand node 40 current level. The signal representing the required change in charging current is provided at the charge current delta node 112. Similarly, the trough demand node 42 is subtracted from the peak sample node 102 to provide a signal that is proportional to the change in inductor 12 current that is required to achieve the trough demand node 42 current level. The signal representing the required change in transfer current is provided at the transfer current delta node 114.

The variable gain voltage to charge time converter 108 receives the charge current delta node 112 level, and generates a logic low state to logic high state transition at the start transfer node 116, which ends the charge period controlling the duration of the charge cycle. The duration of the charge period is controlled to be proportional to the charge current delta node 112 level. The charge duration provided by the variable gain voltage to charge time converter 108 is the charge duration that is required to achieve an updated peak current sample that is equal to the peak demand node 40 voltage. Once the charge cycle is terminated, and the transfer cycle begins, the variable gain voltage to charge time converter 108 is reset, and the start transfer node 116 returns to the logic low state. Vout and Vin are provided to the variable gain voltage to charge time converter 108 to control the voltage to charge time gain such that accurate changes in inductor 12 current per charge current delta node 112 levels can be maintained. The ramp slope control equation 122 in FIG. 6 used to control the gain is evaluated equal to C1*(Vout−Vin)/L.

The variable gain voltage to transfer time converter 110 receives the transfer current delta node 114 level, and generates a logic low state to logic high state transition at the start charge node 118, which ends the transfer period to controlling the duration of the transfer cycle. The duration of the transfer period is controlled to be proportional to the transfer current delta node 114 level. The transfer duration provided by the variable voltage to gain transfer time converter 110 is the transfer duration that is required to achieve an updated trough current sample that is equal to the trough demand node 42 voltage. Once the transfer cycle is terminated, and the charge cycle begins, the variable gain voltage to transfer time converter 110 is reset, and the start charge node 118 returns to the logic low state. Vout and Vin are provided to the variable gain voltage to transfer time converter 110 to control the voltage to transfer time gain such that accurate changes in inductor 12 current per transfer current delta node 114 levels can be maintained. The Vin interface of the variable gain voltage to transfer time converter 110 is connected to GROUND because the inductor 12 is not connected to Vin during the transfer cycle. The ramp slope control equation 122 in FIG. 6 used to control the gain is evaluated with Vin=0 such that the ramp slope becomes C1*Vout/L.

The output node 36 voltage is regulated by controlling the average demand node 44 voltage at the output of the voltage sense amplifier 16 to null the difference between a scaled version of the output node 36 voltage and the voltage reference 35. When the output node 36 is below the desire output voltage level, the average demand node 44 voltage increases, which commands more current to the load element 24 and filter capacitor 22 to increase the voltage at the output node 36. When the output node 36 is above the desired output voltage level, the average demand node 44 voltage decreases, which commands less current to the load element 24 and filter capacitor 22 to decrease the voltage at the output node 36. Thus, the output is voltage regulated as the average demand node 44 voltage is adjusted in response to changes in the output node 36 voltage.

The average demand node 44 is connected to a summation element 28 and a difference element 30. The summation element 28 provides the peak demand node 40 signal by adding the average demand node 44 voltage to one half the ripple demand signal 26. The difference element 30 provides the trough demand node 42 signal by subtracting one half the ripple demand signal 26 from the average demand node 44 voltage. By generating the peak demand node signal 40 and trough demand node signal 42 so that they maintain a constant average inductor 12 current value as they ripple demand signal 26 varies decouples the frequency control loop from the voltage control loop. The ripple demand signal 26 is scaled by one half by the multiplication element 54. The ripple scalar 82 is one half for this example embodiment. However, the ripple scalar 82 can be increased or decreased to control the frequency regulation loop gain.

The ripple demand signal 26 is set to control the ripple current level of the converter, which also controls the converter switching frequency. Comparing the operating frequency of the converter to a frequency reference 80 controls the converter switching frequency. The operating frequency of the converter is provided at the output of the RS flip-flop 52 at the charge transfer control node 50. The reference frequency can be provided by an external signal source, or generated within the converter from an oscillator. The external frequency reference 80 source may be the operating frequency of a second power converter with set phase delays to achieve input current balancing for converters that share a common input voltage source, or to achieve output current balancing for converters that share a common output filter. Multiple converters sharing a common output filter are common in high power multi-phase battery charging systems.

The frequency comparator 78 increases the ripple demand signal 26 voltage when the charge transfer control node 50 frequency is greater than the frequency reference 80. The ripple current level increases as the ripple demand signal 26 increases, which increases the duration of the charge and transfer periods, and thus, the operating frequency of the converter decreases. The frequency comparator 78 also decreases the ripple demand signal 26 voltage when the charge transfer control node 50 frequency is less than the frequency reference 80. The ripple current level decreases as the ripple demand signal 26 decreases, which decreases the duration of the charge and transfer periods, and thus the operating frequency of the converter increases. The frequency comparator 78 adjusts the operating frequency of the converter, such that the charge transfer control node 50 frequency and frequency reference 80 are equal. The frequency comparator 78 can include frequency scaling to permit the operating frequency of the converter to be a fraction of the frequency reference 80. The frequency comparator 78 can also include the capability to phase lock the frequency reference 80 and the charge transfer control node 50.

Figure 6:
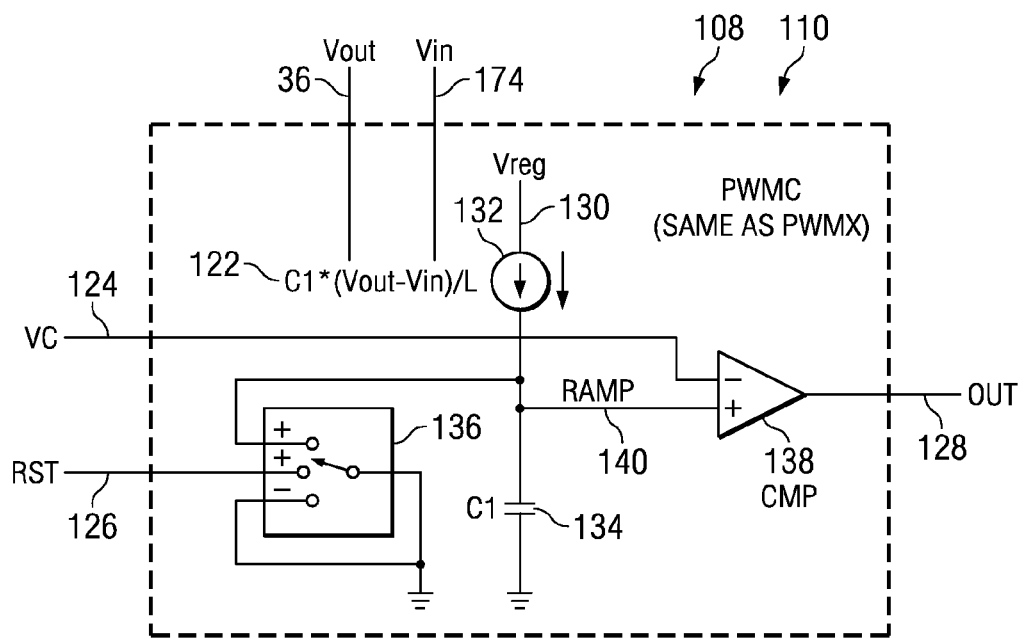
FIG. 6 is a schematic view of a variable gain voltage to pulse width converter.

FIG. 6 is a schematic view of a variable gain voltage to pulse width converter. This schematic view shows a circuit that can be used to provide the variable gain voltage to charge time converter 108, and repeated to provide the variable gain voltage to transfer time converter 110. The variable gain voltage to charge time converter 108 is identical in function to the variable gain voltage to transfer time converter 110 except the variable gain voltage to transfer time converter 110 connects the Vin interface node 174 to GROUND when configured in a system. When this circuit is used as the variable gain voltage to charge time converter 108, the Vin interface node 174 is connected to the input voltage source 34 (Vin).

When the reset PWM node 126 is in the logic high state, the ramp reset switch 136 is on, and the ramp signal node 140 voltage is held near zero volts. This asserts the pulse width comparator 138 output to the low logic state. When the reset PWM node 126 is low, the ramp reset switch 136 turns off, and the ramp signal node 140 voltage increases as the ramp capacitor 134 is charged by the current source element 132. Once the ramp signal node 140 voltage exceeds the conversion voltage input node 124, the pulse output node 128 transitions from the logic low state to logic high state. The current level provided by the current source element 132 controls the slope of the ramp signal node 140 voltage. The current level provided by the current source element 132 is set by the ramp slope control equation 122. The ramp slope control equation 122 sets the ramp current level for accurate voltage level to time interval conversion gain, and compensates for inductor 12 current charge and transfer slope 74 variations with Vout and Vin. The current source element 132 is also connected to a regulated voltage source 130.

This implementation of the variable gain voltage to pulse width converter is provided by example, and is one of many possible approaches that can be used to achieve variable gain voltage to pulse width conversion.

Figure 7:
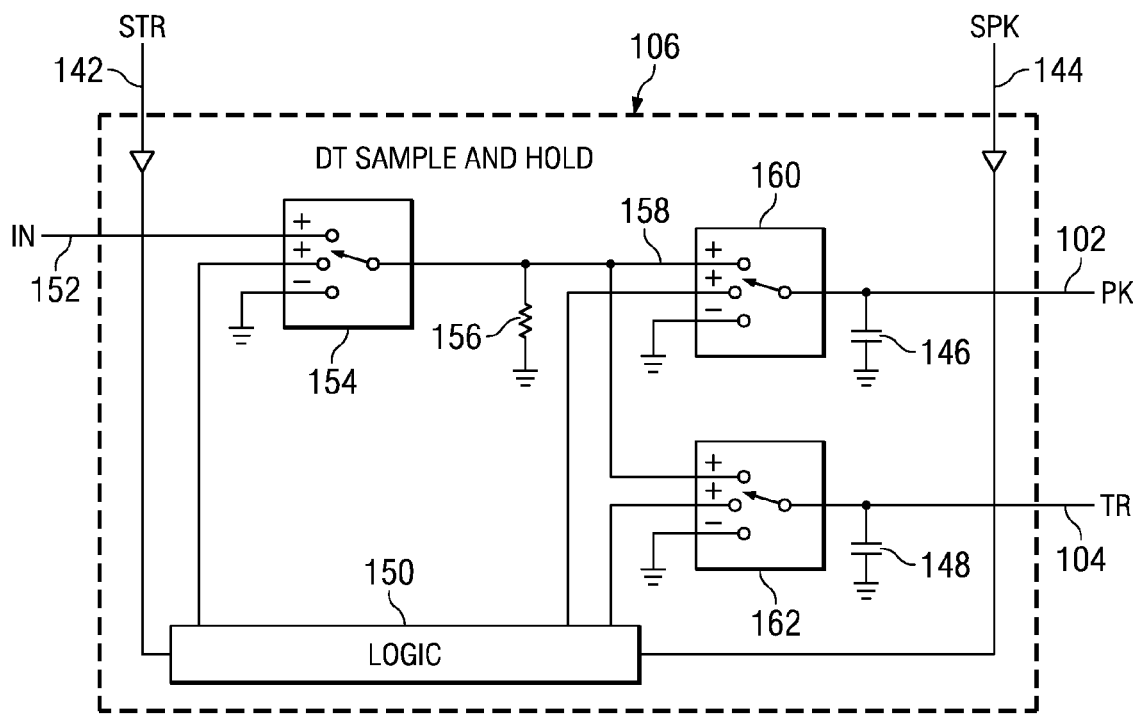
FIG. 7 is a schematic view of a two channel current to voltage level sample and hold.

FIG. 7 is a schematic view of a two-channel current to voltage level sample and hold. This circuit is used to provide the dead time sample and hold 106 function for the current sampling frequency regulated hysteretic average current mode power converter 100. The inductor 12 current is directed from the sampler input node 152 to the current to voltage conversion element 156 by the current sense connect switch 154. The current sense connect switch 154 is controlled by the sampler control logic 150.

When the store peak control input 144 transitions from the logic low state to the logic high state, the current sense connect element is turned on, directing the inductor current into the sample current sense element 156, and the current sample voltage node 158 is proportional to the inductor 12 current level. Then the peak sample switch 160 is turned on to store the current sample voltage node 158 voltage across the peak sample storage capacitor 146. The sampler control logic 150 turns off the peak sampler switch, followed by the current sense switch, to insure that an accurate peak current level sample is achieved and maintained.

When the store trough control input 142 transitions from the logic low state to the logic high state, the current sense connect element is turned on, directing the inductor current into the sample current sense element 156, and the current sample voltage node 158 is proportional to the inductor 12 current level. Then the trough sample switch 162 is turned on to store the current sample voltage node 158 voltage across the trough sample storage capacitor 148. The sampler control logic 150 turns off the trough sampler switch, followed by the current sense switch to insure an accurate trough current level sample is achieved.

The peak sample storage capacitor 146 voltage is provided at the peak sample node 102, and the trough sample storage capacitor 148 voltage is provide at the trough sample node 104. The sampler control logic 150 insures that the sensing and sampling intervals are of short duration, and do not extend beyond the dead time of the current sampling frequency regulated hysteretic average current mode power converter 100. The dead time interval is controlled by using break before make switches for the charge switch 18 and transfer switch 20.

Figure 8:
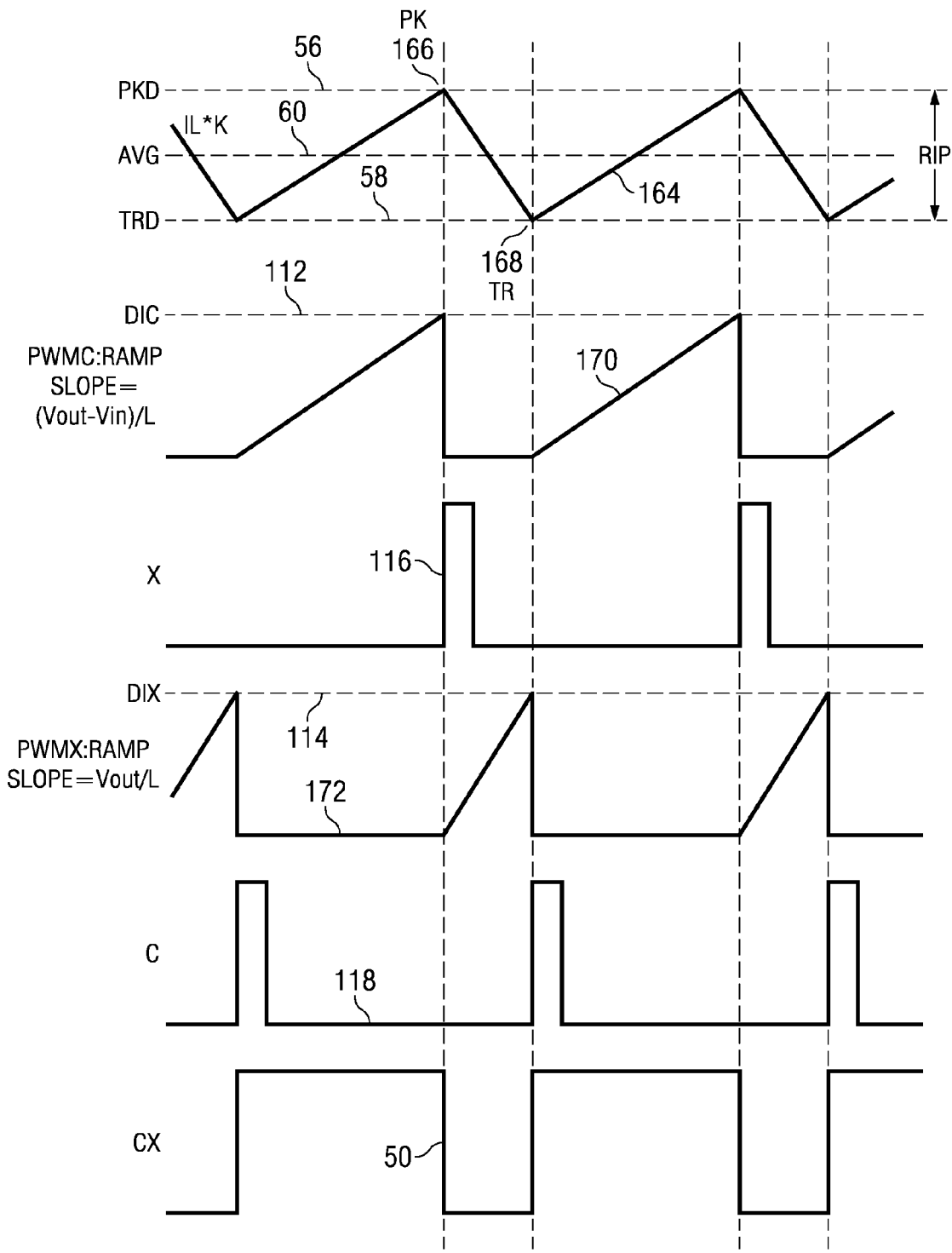
FIG. 8 is a waveform view of current sampling frequency regulated hysteretic average current mode power converter signals.

FIG. 8 is a waveform view of the current sampling frequency regulated hysteretic average current mode power converter 100 signals. A sampler gain scaled inductor current signal 164 is provide to illustrate the correlation between the peak demand node level 56 and trough demand node level 58 and the example peak sample point 166 and example trough sample point 168.

When the start charge node 118 transitions low to high, the charge transfer control node 50 transitions to the logic high state to begin the charge cycle. At the start of the charge cycle the charge ramp signal 170 increases. Once the charge ramp signal 170 exceeds the charge current delta node 112 level, the start transfer node 116 transitions to the logic high state causing the charge transfer control node 50 to return to the low logic state to begin a transfer cycle.

When the start transfer node 116 transitions low to high, the charge transfer control node 50 transitions to the logic low state to begin the transfer cycle. At the start of the transfer cycle the transfer ramp signal 172 increases. Once the transfer ramp signal 172 exceeds the transfer current delta node 114 level, the start charge node 118 transitions to the logic high state causing the charge transfer control node 50 to return to the high logic start to begin a new charge.

The slopes of the charge ramp signal 170 and the transfer ramp signal 172 are controlled to provide correlation between the inductor 12 current, and the peak and trough demand node signals.

Since other modifications and changes varied to fit particular operating requirements and environments will be apparent to those skilled in the art, the invention is not considered limited to the example chosen for purposes of disclosure, and covers all changes and modifications, which do not constitute departures from the true spirit and scope of this invention.

What is claimed is:

1. A power converter for controlling average switching current and operating frequency, said power converter comprising:
    a switching control, operative in an hysteretic average current mode control for providing wide bandwidth operation without the need for slope correction;
    a frequency comparator for varying a ripple current in response to a comparison of a switching frequency to a reference frequency; wherein the ripple current is adjusted to obtain correlation between the switching frequency and the reference frequency;
    a controller for controlling current levels to prevent component stress levels from exceeding a threshold; and
    an amplifier for monitoring current levels.

2. The power converter of claim 1, wherein said amplifier is a current sense amplifier.

3. The power converter of claim 1, wherein said amplifier is a high-gain low-energy current level amplifier.

4. The power converter of claim 1, wherein a feedback loop independent line and regulation of load is provided by continuous ripple current monitoring.

5. The power converter of claim 1, further comprising:
    a transfer voltage to pulse width converter.

6. A method for controlling average switching current and operating frequency, said method comprising:
    varying a ripple current in response to a comparison of a switching frequency to a reference frequency;
    adjusting the ripple current to obtain a correlation between the switching frequency and the reference frequency;
    controlling a plurality of current levels;
    monitoring the ripple current levels, wherein a feedback loop independent line and load regulation is provided by continuous ripple current monitoring.

7. The method of claim 6, wherein monitoring is performed by using variable slope charge and transfer voltage to pulse width converter when operating with a current sampler based system.

8. A system for providing power conversion, said system comprising:
    a plurality of voltage-to-current power converters coupled in parallel with other at least one voltage-to-current power converter comprising:
        switching control, operative in an hysteretic average current mode control for providing wide bandwidth operation without the need for slope correction;
        a frequency comparator for varying a ripple current in response to a comparison of a switching frequency to a reference frequency; wherein the ripple current is adjusted to obtain correlation between the switching frequency and the reference frequency;
        a controller for controlling current levels to prevent component stress levels from exceeding a threshold; and
        an amplifier for monitoring current levels.

9. The system of claim 8, wherein said amplifier is a current sense amplifier.

10. The system of claim 8, wherein said amplifier is a high-gain low-energy current level amplifier.

11. The system of claim 8, wherein a feedback loop independent line and regulation of load is provided by continuous ripple current monitoring.

12. The system of claim 8, further comprising:

a transfer voltage to pulse width converter.

\* \* \* \* \*